United States Patent
Benet

(12) 
(10) Patent No.: US 6,294,146 B1
(45) Date of Patent: Sep. 25, 2001

(54) CONTINUOUS CHEMICAL REACTION UNDER CONTINUOUS PRESSURE AND TURBULENCE

(76) Inventor: Gabriel Benet, 2350 Scotch Pine Dr., West Bloomfield, MI (US) 48323

( * ) Notice: Subject to any disclaimer, the term of this patent is extended or adjusted under 35 U.S.C. 154(b) by 0 days.

(21) Appl. No.: 09/370,205

(22) Filed: Aug. 9, 1999

(51) Int. Cl.[7] .................................................... C01G 3/70
(52) U.S. Cl. .................................................... 423/557
(58) Field of Search ...................... 423/36, 557

(56) References Cited

U.S. PATENT DOCUMENTS

| | | | |
|---|---|---|---|
| 286,735 | * 12/1883 | Rossler | 423/395 |
| 1,944,444 | * 1/1934 | Marsh et al. | 423/395 |
| 1,949,927 | * 3/1934 | Corson et al. | 423/395 |
| 2,153,908 | * 4/1939 | Bagby | 423/395 |
| 2,533,245 | * 12/1950 | Harike | 423/395 |
| 4,251,489 | * 2/1981 | Kniprath et al. | 423/41 |
| 5,310,533 | * 5/1994 | Browne | 423/604 |

FOREIGN PATENT DOCUMENTS

| | | | |
|---|---|---|---|
| 1188035 | * 4/1970 | (GB) | 423/395 |
| 408103655 | * 4/1996 | (JP) . | |

OTHER PUBLICATIONS

Ullmann's Encylopedia of Industrila Chemistry, 5th ed., vol. A7, pp.567–583.*
Hawley's Condensed Chemical Dictionary, 13th ed., 1997, pp. 957.*
Merrian Webster's College Dictionary, 10th ed., 1997, pp. 972.*

* cited by examiner

Primary Examiner—Steven P. Griffin
Assistant Examiner—Maribel Medina

(57) ABSTRACT

Continuous chemical reaction under continuous pressure and turbulence utilizing a plurality of towers in series. A reagent liquid is pumped to proximate the top of a first of a single or and plurality of towers. A reagent gas is introduced under pressure between the pump discharge and the first tower. The liquid is maintained at sufficient pressure and rate of flow to prevent the gas from backflowing through the pump. The portion of the gas initially trapped at the top of the first tower that dissolves in the liquid and is a residue of reaction with another reagent in the tower, is forced with the liquid reagent at the bottom of the first tower into proximate the top next tower. The reagent liquid and gas fluid is fed from proximate the bottom of the first tower to the next tower in series. The fluid from the last tower in series is discharged from proximate its bottom to the initial tank from which the liquid was drawn. Preferably, a valve is provided governing the flow of this discharge, consequently governing the pressure in the last tower in series, and consequently pressure in the whole series, at sacrifice of flow rate.

2 Claims, 1 Drawing Sheet

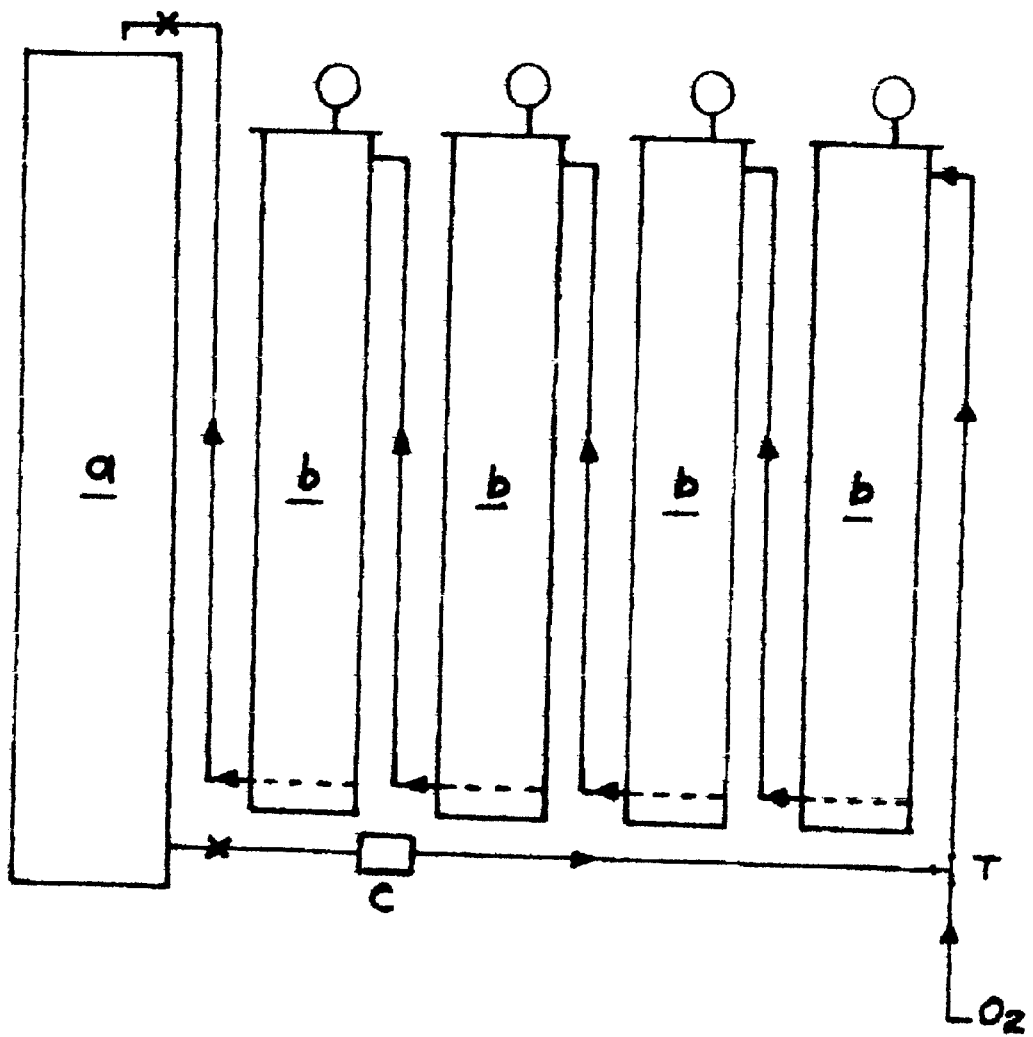

CONTINUOUS CHEMICAL REACTION UNDER CONTINUOUS PRESSURE AND TURBULENCE

This invention relates generally to continuous chemical reaction, as opposed to batch processing, under continuous pressure and turbulence utilizing a plurality of towers in series. More specifically, this invention relates to a reagent liquid being pumped to proximate the top of a first of a plurality of towers; a reagent gas being introduced under pressure between the pump discharge and the first tower; the liquid being maintained at sufficient pressure and rate of flow to prevent the gas from backflowing through the pump, such that the gas initially trapped at the top of the first tower is forced through the liquid reagent at the bottom of the first tower; the reagent liquid and gas being fed from proximate the bottom of the first tower to the top of the next tower in series; the fluid from the last tower in series being fed to the initial tank from which the liquid was drawn.

U.S. Pat. No. 5,339,538 issued in 1993 to Pinske and assigned to Babcock & Wilcox Company is entitled "FLUID BED MATERIAL TRANSFER METHOD". A pair of fluidized bed enclosures, each supplied with air is disclosed. A stream of air flowing upward through a bed of solid particles is disclosed. This flow is at a sufficient high rate to form bubbles in the bed causing high turbulence. At even higher rates of flow particles are suspended in the air and combustion streams, transporting upwardly and collected and returned to process. No disclosure of pressurized oxygen as opposed to air nor gas and liquid introduction into the top of a reaction chamber as opposed to its bottom, nor use of large slabs of solid reactant as opposed to particles.

U.S. Pat. No. 5,286,466 issued in 1994 to Hardison and assigned to Art Technologies, Inc. is entitled "MULTI-BED COCURRENT DOWNFLOW MASS TRANSFER COLUMN WITH SPHERICAL PACKING". A packed mass transfer tower for intimate gas-liquid contact and efficient mass transfer. Solid material is required to be in hollow spheres, No disclosure of pressurized oxygen as opposed to air, nor use of large slabs of solid reactant as opposed to small particles.

BRIEF DESCRIPTION OF THE DRAWINGS

The FIGURE is a diagram of an apparatus used in the preferred embodiment of this invention. Before explaining and specifying further attributes of this invention, it is to be understood that the phraseology and terminology employed herein is for the purpose of description and not limitation. Furthermore, the invention can be practiced or carried out in various ways.

DETAILED DESCRIPTION

The FIGURE illustrates the apparatus used in the preferred embodiment of this invention. The equipment comprises:

1) A 4,000 gals. storage tank (a).
2) Four towers (b) of 1' diameter×10' high and flanged tops. The towers are connected in series. The feed is located 3" below the top; the discharge is located 3" above the bottom; and the last discharge goes back to the storage tank equipped with a ball valve. Location of the feed and discharge positions is important for the operation.
3) A centrifugal pump (c). Preferably a ss 304-3" feed, 1½ discharge. A magnetic 25 HP 3" feed×2" discharge is optional for corrosion resistant materials against reactance for chlorides. The feed is connected to the nozzle at the bottom of the storage tank (a), which is equipped with a 2" valve. The discharge is connected to a "T" in this position. The lower leg of the "T" is equipped with a ½" check valve, which in turn is connected to a pressure regulator attached to a cylinder of liquid oxygen. The upper leg of the "T" is connected to the top of the first tower to be fed. The discharge of the last tower goes back to the storage tank (a) with a valve.

The discharge of the last tower goes back to the storage tank with a valve. All lines are 2", except a small section at the discharge of the pump because it is only 1½".

Preferred Method: Manufacture of Copper Sulfate

Operation

The towers are loaded with ⅝₁₆"×1" copper rod. About 15,000 lbs. of copper will fill the towers. The storage tank is loaded with 3,000 gals. of 10% sulfuric acid solution.

The valve is open and the pump started.

After the solution is flowing back to the tank, oxygen is opened and maintained at a pressure of 10 lbs. above the original pressure from the discharge of the pump (about 80–90 lbs. per square inch).

The acid will be completely neutralized in less than 24 hours. In fact, it oxygen is overfed, basic copper sulfate will begin to form. Oxygen efficiency is about 90%. The reaction is highly exothermic, and after it gets hot (130 degrees F.), the feed of the oxygen can be increased to more than 20 CFM.

The concentration of copper sulfate is unlimited depending upon the concentration of the acid that is used to start the reaction, thus saving evaporating costs if the higher concentration is desirable, as in order to produce, continuously, copper sulfate crystals.

A Process to Manufacture Basic Copper Sulfate

Operation

The towers are loaded with ⅝₁₆"×1" copper rod. About 15,000 lbs. of copper till the towers.

The storage tank is filled with 3,000 gals. of about 10% sulfuric acid solution. After the solution is flowing back to the tank, the oxygen is opened and maintained at a pressure of 10 lbs. per square inch above the original pressure from the discharge of the pump. The acid will be completely neutralized in less than 24 hours, and basic copper sulfate will start to precipitate. It is possible to precipitate all of the copper as basic copper sulfate, but it is preferable to leave an optimum amount of copper since the color of the basic will darken and the oxygen will be less efficient, The basic copper sulfate could be filtered continuously while sulfuric acid additions are made to replace stoichiometrically the precipitate so maintaining a completely continuous process.

A high grade of basic copper sulfate is produced without alkaline additions nor producing any effluent that cannot be recycled back into the system.

A Process to Bleach Paper

Equipment

The same equipment as outline above can be used, for reasons of convenience, however, for large volumes of production, painted steel or reinforced concrete would be more economic or feasible.

Operation

The storage tank was loaded with a slurry of scrap paper made by stirring about 1 ton of old newspapers in 3,000 gals. of water until fairly smooth. The Ph of the slurry was adjusted to 11.0 in order to increase the solubility of the ores. This step is not needed if bleaching virgin pulp.

The bottom valve at the bottom of the storage tank was opened, and the pump started. When the pressure reached equilibrium, the oxygen was opened and the pressure of the oxygen was regulated to be 10 lbs. per square inch above the equilibrium pressure about 80 lbs.

In order to increase the equilibrium pressure, we had to restrict the return valve (discharge from the last tower) until the equilibrium pressure was at least 70 lbs. per square inch. We found lower pressures significantly slow down the process.

Every hour a sample was taken and, after drying, compared to a color standard for a match. Every sample was reduced in color by approximately 18% every hour of operation.

Higher temperatures greatly accelerate the process, with an optimum of 160 degrees F. Also, higher pressures but not so dramatically since the water can be reused the heating cost would be reduced.

A Process to Concentrate Precious Metals from Base Metals Alloys and Concentrate Ni 48.8%

Cu 23.6%

Pt 0.16%

Pd 0.10%

S balance

Operation

The towers are loaded with 12,000 lbs. of South African matte, and the flanges bolted. This material is chosen because of the well-known difficulties related to its processing as compared to other alloys like copper blister. The storage tank was filled with 3,500 gals. of a solution of 10% sulfuric acid in deionized water. The discharge valve at the bottom of the storage tank is opened and the pump is started. When the pressure has reached equilibrium, the oxygen is opened and the pressure of oxygen is set 10 lbs. per square inch above the equilibrium pressure. After 24 hours of operation, the storage tank was filtered and the filtrate contained:

| | |
|---|---|
| H2SO | 58 grs/l |
| Nickel | 54 grs/l |
| Copper | 24 grs/l |
| Pt | N |
| Pd | ND |

The solids contained on a dry basis:

| |
|---|
| 32.2 lbs. |
| Pt = 16.1% |
| Pd = 10.0% |
| Ni = 3.8% |
| Cu = 6.0% |

Nitrates

It is important to observe certain modifications regarding the operation in order to produce nitrates in a safe manner. The operation must be started with a minimum of volume of the desired nitrate solution to be enough to fill the towers plus some excess. The volume of the anti towers is about 240 gals.; we started the task with 500 gals. of nickel nitrate which contained about 10% nickel.

Also a pressure relief cabal was installed as a precautionary measures. The reason why the steps were taken is because if the reaction is started with a peer solution of nitric acid the reaction may get out of hand because of the formation of large volumes of nitric oxide gases, rendering the operation hazardous.

Preparations for Operation

1) The towers were loaded with 14,500 lbs. of 2"×2" nickel squares.

2) The storage tank was loaded with 500 gals. of 10% nickel as Ni(N03)2

3) A second storage tank, 4,000 gals. capacity 304 S S, equiped with a lightning mixer and a metering pump with piping discharging into our regular storage tank.

This storage tank was loaded with 2,000 gals. approximately 25% nitric acid. For identification purposes this storage tank will be designated tank "B". The metering pump out of tank B is activated by a Ph meter determining the Ph of the return solutions into the storage tank. A Ph above 5.0 will activate upon. A Ph below 3.5 will stop the pump.

Operation

The valve and more of our regular storage tank is open and a pump is started. After the solution is flowing back into the tank the valve in the storage tank "B" is opened and the metering pump will start the flow of the nitric acid solution into the storage tank "A".

The oxygen valve is opened until oxygen pressure exceeds the pressure of the line by 10 lbs. per square inch. After 8 hours of operation 1,520 gals. of nickel nitrate solution were produced and about 1,600 lbs. of nickel was dissolved.

The ratio of nitric to nickel produced demonstrated that the nitric is stoichiometrically used without liberating any nitric fumes, because of the oxidation of the oxygen over these nitric oxides.

I claim:

1. A process for the production of copper sulfate comprising a continuous chemical reaction, under continuous pressure and turbulence, of a sulfuric acid solution, copper rod, and oxygen, wherein the process comprises
   a) loading at least one enclosed tower, comprising a top and a bottom, with copper rod;
   b) introducing a 10% sulfuric acid solution flow at a pressure to the top of said at least one enclosed tower
   c) introducing oxygen into the sulfuric acid flow at a pressure 10 psi above the pressure of said sulfuric acid solution flow;
   d) contacting said copper rod with said sulfuric acid solution flow and said oxygen to precipitate the copper as copper sulfate; and
   e) continuously filtering said copper sulfate while adding sulfuric acid to maintain stoichiometry within said at least one enclosed tower so as to maintain said continuous chemical reaction.

2. The process of claim 1, wherein the pressure of said sulfuric acid solution flow is in the range of about 80 to 90 psi.

* * * * *